June 14, 1966  C. O. MUSSER  3,255,539
PLANETARIUM
Filed May 10, 1963  2 Sheets-Sheet 1
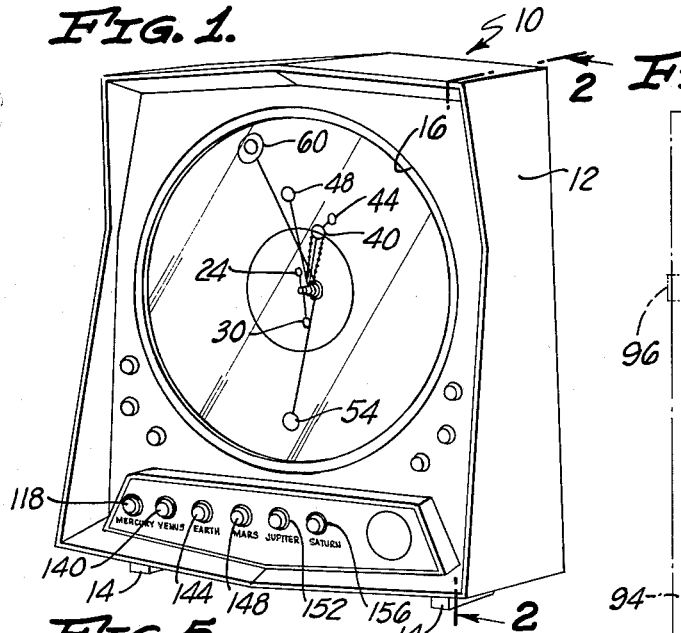
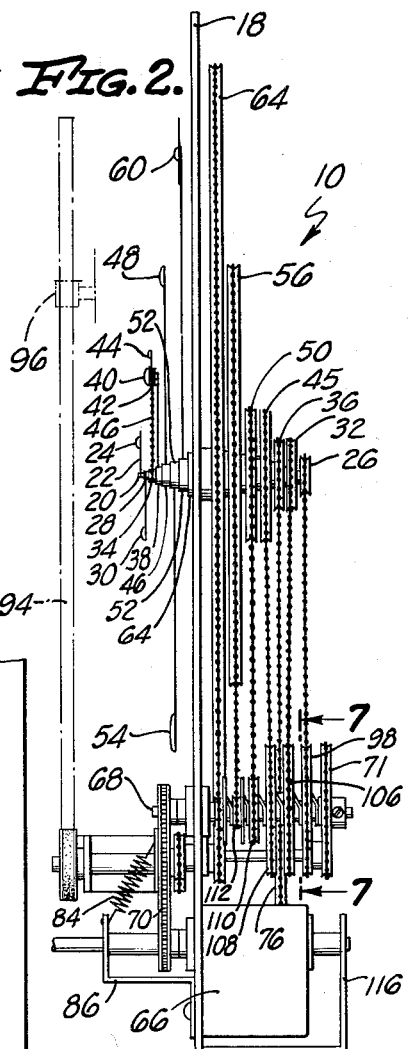
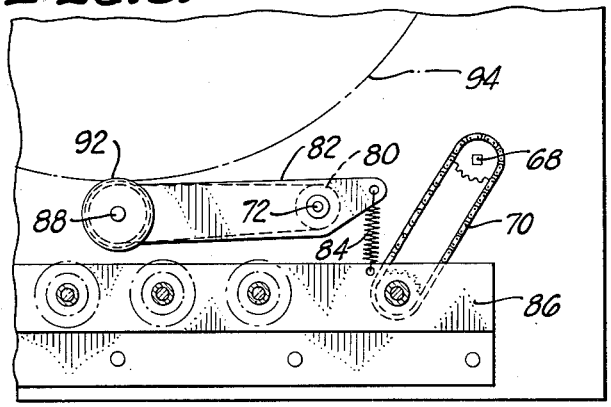
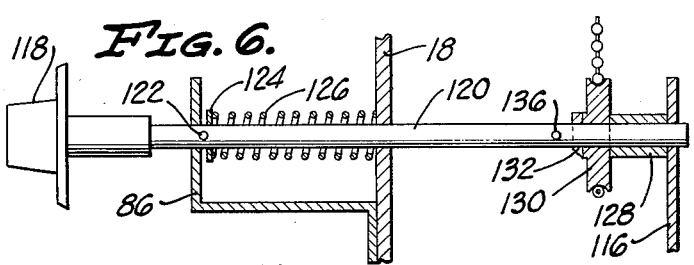
INVENTOR.
CLAIR OMAR MUSSER
BY
EDWARD D. O'BRIAN
ATTORNEY June 14, 1966 C. O. MUSSER 3,255,539
PLANETARIUM
Filed May 10, 1963 2 Sheets-Sheet 2

INVENTOR.
CLAIR OMAR MUSSER
BY
EDWARD D. O'BRIAN
ATTORNEY

United States Patent Office 3,255,539
Patented June 14, 1966

3,255,539
PLANETARIUM
Clair Omar Musser, 12997 Blairwood Drive,
Studio City, Calif.
Filed May 10, 1963, Ser. No. 279,551
4 Claims. (Cl. 35—45)

This invention is directed to an improved Copernican Orrery Planetarium.

For his entire existance upon the earth, man has been tantalized by the mysteries of his earth and the heavens above it. Man's curiosity has been driven upon a search for the answer to the questions in his mind directed to the relationship to these elements. Man's conceit through the ages had caused him to believe in and propound a geocentric universe. Not only that, but the man of early civilizations believed that his country and even his city was the center of the universe. This was particularly true of such civilizations as the Egyptian, Chaldean, Greek and Hindu. Only since 1533 has the heliocentric understanding of the universe been understood even by a few. In that year Nicolaus Copernicus described his revolutionary new model of the universe, and thus turned the face of the whole human race in a direction which laid the foundation for all subsequent intellectual progress in the field of astronomy.

Charles Boyle, the fourth Earl of Orrery, developed a physical model of this Copernican universe. Such models are still termed orreries as a result of Boyle's activities in astronomy. Conventional orreries normally consist of a stand on which there is mounted a series of balls corresponding to the earth, the other planets of the solar system and the sun. A structure of this type is relatively fragile and has a number of important limitations for use as a teaching medium. Such orreries carry a center shaft upon which is mounted a sun-ball. Mounted for a rotation on wires therearound are the various planets. While the size of the planets and the radius of the innermost planets can and normally are shown in scale, such orreries are not normally arranged so that the relative motion in scale speed can be demonstrated as the planets traverse their orbits. Accordingly such orreries can not dynamically demonstrate the angular relationship of the various planets.

Accordingly it is a broad object of the present invention to provide a new and improved orrery. A more specific object of this invention is to provide an orrery which demonstrates and illustrates the angular rotation of the various planets about the sun in scale speed so that the angular relationship is always accurately maintained. It is another object of this invention to provide adjustability of the angular relationship of the various planets so that their relative positions in timed periods in the past and the future can be accurately demonstrated without running the orrery for an extended period of time. It is a further object to provide a rotatable transparent screen carrying indicia in front of the planets so their relationship can be accurately demonstrated.

Because of the nature of this invention it is not considered necessary to set forth in this specification further lists of objects and advantages. Such other objects and advantages of invention will be more fully apparent from a detailed study of the remainder of this specification, including the appended claims, and the accompanying drawings in which:

FIGURE 1 is a perspective, generally front elevation of the instant orrery;

FIGURE 2 is a side elevation of the orrery without its housing, taken generally along the line 2—2 of FIGURE 1;

FIGURE 5 is a front elevational detail;

FIGURE 6 is a partial cross-sectional detail taken along one of the planet adjusting shafts;

FIGURE 7 is a section taken along line 7—7 of FIGURE 2;

FIGURE 8 is a perspective view of a ball-chain sprocket.

Figure 3:
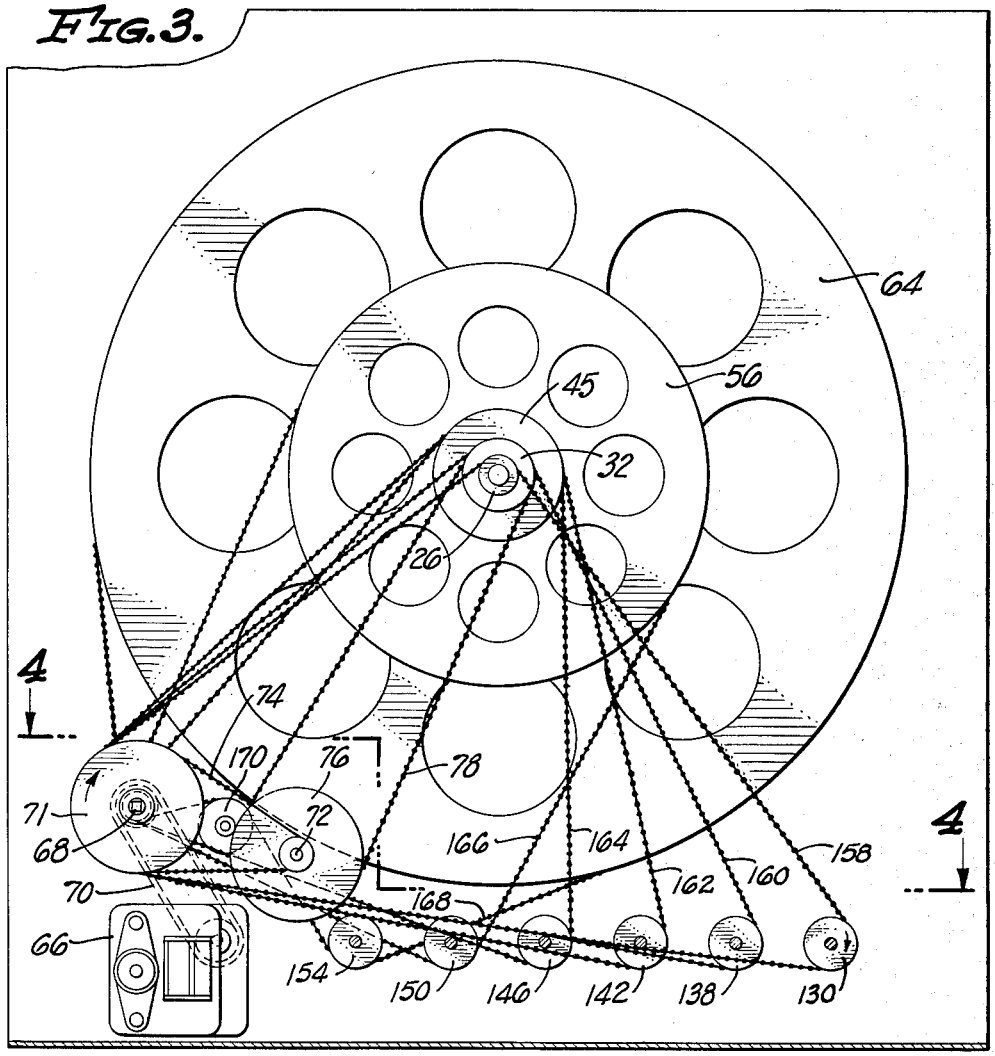
FIGURE 3 is a rear elevation of the orrery without its housing.

It is to be understood that the following description and the accompanying drawings are intended to designate a presently preferred embodiment of this invention. Those skilled in the art to which this invention pertains will realize, however, that orreries accomplishing the same objectives can be constructed by substituting various equivalent mechanisms for those parts of the particular orrery herein described.

As an aid to understanding this invention it may be started in essentially summary form that it concerns orreries which have a housing with the sun and the heliocentrically mounted planets visible from the front of the housing. The planets, and the earth moon are driven by an accurate drive train so that the angular velocity of each planet is proportional to true velocity. The drive train includes adjustment for each one of the planets so that its angular position may be set with respect to the angular position of the remaining planets. The establishment of such angular position is accomplished by a manual knob suitably connected into the drive train of the particular planet which is to be adjusted, the manual knob being connected to effect adjustment of only that particular planet. The adjustment, or setting, of various planets is established from published information on that relationship, which published information is called the ephemeris and is available for past and future dates. Accordingly, accurate angular relationship of the planets can be established without running the orrery for an extended period of time to obtain the desired angular relationship.

Because of the nature of this invention, it is better and more fully explained by reference to the accompanying drawings.

The orrery is generally shown in FIGURE 1 by the indicia 10. It has a case 12 having feet 14, making it suitable for standing upon a table or other similar support. The front of the case 12 has an aperture 16 through which the planets are viewed.

As better seen in FIGURE 2, the orrery 10 is provided with a main mounting plate 18, the front side of which is visible through the aperture 16 and accordingly the front side of the main mounting plate 18 is colored in such a manner as to present a proper appearance. It may be dark blue to represent the night sky, and may carry representations of stars in the sky. A Mercury shaft 20 extends through an aperture in the center of the mounting plate 18 and carries on its front end a wire 22 upon which is mounted a representation of the planet Mercury at 24. The rear end of the Mercury shaft 20 carries a Mercury drive sprocket 26 which is driven in a manner which is hereinafter described. Embracing the Mercury shaft 20 is the hollow Venus shaft 28 which carries on its forward end a representation 30 of Venus suitably mounted upon a wire. Both the Mercury and Venus support wires, as well as the wires hereinafter described, are colored in such a way as to be virtually invisible against the backdrop presented by the main mounting plate 18. The rear end of the Venus shaft 28 carries a Venus drive sprocket 32 for drive thereof. Embracing the Venus shaft 28 is the moon drive shaft 34 which carries a sprocket at its outer end and a moon drive sprocket 36 at its rearward end behind the main mounting plate 18. Mounted on the moon drive shaft 34 is another hollow drive shaft 38 which supports a representation 40 of the earth upon a wire mounted thereupon. Mounted behind the earth 40 on its mounting wire is a moon sprocket 42 which carries a representation 44 of the earth's satellite mounted on a wire thereupon. A suitable ball chain 46 passing over the sprocket on the front end of the moon drive shaft 34 and the sprocket 42, drives the moon 44 around the earth 40 in accordance with the rotation of the moon drive sprocket 36. Sprocket 45 is mounted on the rear of earth drive shaft 38.

Surrounding the earth drive shaft 38 is another hollow shaft 46 which supports on its forward end a representation of Mars 48 by means of a wire connected therebetween. Shaft 46 carries at its rear end the Mars drive sprocket 50.

A hollow Jupiter shaft 52 surrounds the Mars shaft 46 and supports on a wire upon its forward end a representation of Jupiter 54. The rear end of Jupiter shaft 52 carries a Jupiter drive sprocket 56. Surrounding the Jupiter shaft 52 is a Saturn shaft 58 which carries a representation of Saturn 60 mounted upon a wire thereon. The rear end of Saturn shaft 58 carries a Saturn drive sprocket 64. The Saturn shaft 58 is carried in a bearing 64 mounted within the main mounting plate, so that all of the hereinbefore described planet shafts, and the moon drive shaft, are properly supported for rotation with respect to each other and for rotation with respect to the main mounting plate 18. Of course, more or fewer planets could be represented, and more detail could be represented with respect to the various moons of the individual planets, depending on the overall size of the orrery 10 and depending on the amount of detail desired.

Figure 4:
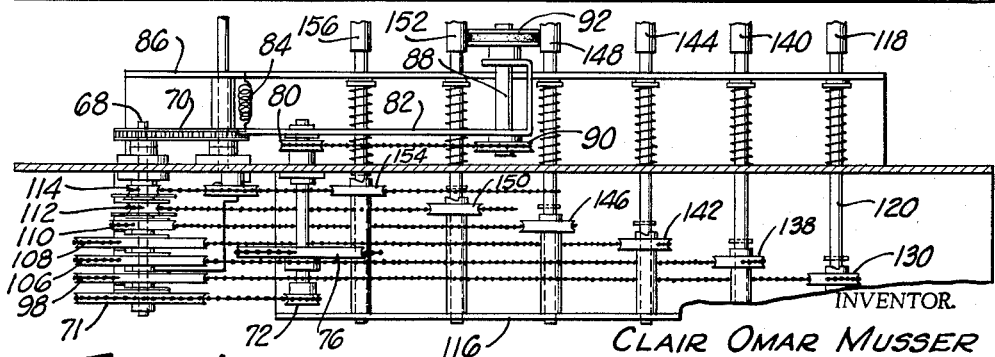
FIGURE 4 is a section taken along the line 4—4 of FIGURE 3.

Referring now more particularly to FIGURES 2, 3 and 4, the manner of the particular drive of the individual planet drive sprockets as shown therein represents the preferred embodiment. Main motor 66 is mounted on the mounting plate 18. Motor 66 is preferably of the substantially constant speed variety powered by electric current so that the rotation of the various planets is at an appropriate scale velocity. However, if desired, the motor 66 may be either spring powered, if this is preferable for a particular special environment of the orrery, or it may be a variable speed variety to permit especially rapid, or especially slow motion, as may be desired. Motor 66 drives shaft 68 through the agency of an appropriate chain and sprocket arrangement 70. Secured to the shaft 68 is a ball chain sprocket 70 which drives countershaft 72 through a suitable ball chain 74. The ball chain and sprocket combination is such that the countershaft 72 operates at a higher speed than the shaft 68. Countershaft 72 carries a further sprocket 76 around which passes a moon drive ball chain 78 which is also in driving engagement with the moon drive sprocket 36. The purpose of this speed-up is to drive the moon 44 at its appropriate velocity around the earth 40.

The forward end of the countershaft 72 carries a further sprocket 80, and a lever 82 pivoted thereon. The lever 82 carries a spring 84 secured to one end of the lever and to a bracket 86 secured to the main mounting plate 18. Accordingly, the lever 82 is urged in clockwise direction around a shaft 72 as seen in FIGURE 5. The outer end of the lever 82 carries a shaft 88 which is directly under the center of the aperture 16. The shaft 88 carries a ball chain sprocket 90 fixed to one end thereof which is driven from the sprocket 80 by a suitable ball chain. The shaft 88 also carries a friction drive wheel 92 located adjacent to the aperture 16.

A circular transparent screen 94 may optionally be mounted to be driven by the friction drive wheel 92 and guided by additional guide rollers 96. Such a screen may carry any of a variety of desirable astronomical indicia such as, for example, an opening corresponding to the hemisphere visibility from any particular point on earth so that the planets viewed through this particular hemisphere correspond to those seen at a particular time at that point on the surface of the earth. Such indicia as comet tracks or artificial satellite tracks may also be plotted on such a screen. It is seen from the above description, that the screen 94 is rotated at a particular speed. This speed is the same as the earth's simulated rotational speed so that geocentric plots may be used therewith. Accordingly relative angles from the earth can be readily read from such a geocentric screen.

As is better seen in FIGURE 7, shaft 68 is square. Mounted upon this square shaft 68 is a series of ball chain sprockets, the first of which is indicated at 98. The sprocket 98 and its companions have circular bores and within these circular bores are bearings for rotation of the sprocket 98 thereupon. The interior of the bearings are square to fit irrotatably on the shaft 68. Behind the sprocket 70, which has been hereinabove described as secured to the shaft 68, is located a hub 100 which has a square bore to fit the square shaft 68 and carries a pawl 102. Thus the pawl 102 rotates with the shaft 68. The sprocket 98 has on its rear face adjacent to pawl 102, a series of radial ratchet teeth 104 which are designed for engagement with the pawl 102. From this assembly, which is most clearly seen in FIGURE 7, it is seen that clockwise rotation of the square shaft 68 drives the sprocket 98 through the agency of pawl 102 engaging with the ratchet 104. It is clear from this construction, however, that if otherwise driven in a clockwise direction as seen in FIGURE 7, the sprocket 98 will be free to rotate upon the shaft 68 with the pawl 102 freely ratcheting.

The sprocket 98 is the Mercury driver, and behind it is sprocket 106 which is the Venus driver, and then sprocket 108 which is the earth driver. Behind that is the sprocket 110 which is the Mars driver, and then are sprockets 112 and 114 which are respectively the Jupiter and Saturn drivers. Each of these drivers is of appropriate diameter, along with the diameter of the driven sprockets hereinbefore described, so that the various planet peregrinate at their proper scale orbital velocities.

Spaced behind the sprocket 70 on shaft 68, and in front of each of the other drivers on square shaft 68, is one of the hub-pawl mechanisms such as has been described with respect to hub 100. Each of the pawls is of such resiliency that this stack of parts flexes the pawls. The pawls, themselves have the inherent spring flexibility to cause proper action of the ratchet-pawl combinations. Accordingly, each one of the drivers on shaft 68 is capable of being freely moved in one direction, and driven in the other direction by shaft 68, so that one-way drive action is obtained.

Supported through bearing bores in the main mounting plate 18, bracket 86, and further bracket 116 are a plurality of planet adjusting shafts one of which is shown in detail in FIGURE 6. Shown therein is the Mercury adjusting knob 118 mounted on shaft 120 which passes through the bearing bores in the several brackets as hereinabove mentioned. Behind the bracket 86, the shaft 120 is traversed by a hole through which a pin 122 extends. Behind the pin is a washer 124 against which spring 126 bears. The other end of the spring bears upon the front side of the main mounting plate 18 to urge the shaft 120 and its knob 118 leftwardly as shown in FIGURE 6. Hub 128 is mounted on the shaft 120, and the hub 128 carries thereupon a Mercury adjusting sprocket 130. The front of the hub 128 carries spiral ramps 132 which terminate in axial flats 134. A pin 136 traverses the shaft 120 in such a position that when the knob 118 is urged to the right as shown in FIGURE 6, the pin 136 enters the spiral ramps 132 and engages upon the axial flats 134 so that counterclockwise rotation of the knob 118 causes rotation of the Mercury adjusting sprocket 130. When manual engagement of Mercury adjusting knob 118 is removed, the spring 126 urges the shaft 120 to the left as seen in FIGURE 6, and the pin 136 disengages from the flats 134. Conventional retention means holds the hub 128 against the bracket 116. This conventional means may be a spring between the front of the sprocket 130 and the mounting plate 18.

Additional similar structures are mounted for similar purpose with respect to each one of the planets. For example, sprocket 138 is adjusted by Venus adjusting knob 140, and sprocket 142 is adjusted by earth adjusting knob 144. Similarly Mars sprocket 146 is adjusted by Mars adjusting knob 148, Jupiter adjusting sprocket 150 is controlled by Jupiter adjusting knob 152 and Saturn adjusting sprocket 154 is controlled by Saturn adjusting knob 156.

Bead chains circumscribe the various sets of sprockets so that they are mechanically connected for proper rotation. For example Mercury is rotated by bead chain 158 which passes around sprockets 98, 130 and 26. Venus is rotated by a bead chain 160 which passes around sprockets 106, 138 and 32 and earth is rotated in its peregrinations by a chain 162 which passes around sprockets 108, 142 and 45. Similarly, Mars moves in its peregrinations by means of bead chain 164 which passes around sprockets 110, 146 and 50. Furthermore, Jupiter revolves in its orbit by means of chain 166 by means of Jupiter chain 166 which passes around sprockets 112, 150 and 56. Furthermore, Saturn is rotated and moved through its orbit by means of chain 168 which passes around sprockets 114, 154 and 64. Additionally, chain 168 passes around idler 170 which improves the wrap of this chain around the sprockets 114 and 154.

It is clear from this description that a mechanism is disclosed in which, when the motor 66 is energized, the various planets peregrinate through their orbits at proper scale speeds. Furthermore, by manual actuation of any one or more of the various planet adjusting knobs, the planets may be set to particular positions with respect to each other. This manual adjustment feature provides easy and rapid setting of the angular relationship of any particular time in the past or future and accordingly easily and rapidly illustrates the particular angular relationship of the planets at that time. The chain structure, together with its associated sprockets and ratchet and pawl driving mechanism provides an accurate and positive drive in the one direction of normal motion, and yet permits ease of adjustment.

This invention, having been described in its preferred embodiment, describes a structure which is capable of numerous minor modifications and changes with equivalent elements. Accordingly the scope of this invention is defined by the appended claims.

I claim:

1. In an orrery planetarium, an opaque screen, a plurality of concentric shafts extending through said opaque screen from its front side to its rear side, the front side of said opaque screen being visible from the outside of said planetarium, a simulated planet secured to each of at least two of said concentric shafts where said concentric shafts extend through to the front side of the said opaque screen, drive sprocket means secured to each of said concentric shafts where said concentric shafts extend through the rear side of said opaque screen;

drive means connected to drive each of said drive sprocket means, said drive means including power means and additional sprocket means driven by said power means, unidirectional drive means connected to drive each of said additional sprocket means, means to adjust said additional sprocket means and said drive sprocket means with respect to said power means, said means to adjust including a manually operable adjustment means associated with each of said planet simulating means, said manual adjustment means comprising an adjustable sprocket corresponding to each drive sprocket means and a chain passing over each corresponding planet drive sprocket means, said adjustable sprocket and said corresponding additional sprocket whereby rotation of said manual means adjusts said additional sprocket and said planet drive sprocket.

2. The orrery of claim 1 further including a screen that is at least partially transparent mounted in front of said opaque screen and said simulations of planets, said screen being rotated by said power means.

3. The structure of claim 2 wherein said screen rotates at the same angular velocity as the rotation of the earth's simulation around its shaft.

4. The structure of claim 3 wherein said unidirectional drive mechanism is a ratchet and pawl mechanism.

References Cited by the Examiner
UNITED STATES PATENTS

| | | | |
|---|---|---|---|
| 1,982,495 | 11/1934 | Browning | 58—85.5 X |
| 2,226,032 | 12/1940 | Wahlberg | 35—45 |
| 2,606,373 | 8/1952 | Lamberger | 35—28.3 |
| 3,035,356 | 5/1962 | Musser | 35—45 |
| 3,101,558 | 8/1963 | Young | 35—74 |

EUGENE R. CAPOZIO, *Primary Examiner.*

HARLAND S. SKOGQUIST, *Assistant Examiner.*